United States Patent
Sanz et al.

(10) Patent No.: US 9,486,766 B2
(45) Date of Patent: Nov. 8, 2016

(54) PNEUMATIC SYSTEM FOR DENSELY LOADING CATALYST INTO BAYONET TUBES FOR A STEAM REFORMING REACTOR-EXCHANGER WITH A DETACHABLE FEED TUBE FOR GAS

(71) Applicant: IFP ENERGIES NOUVELLES, Rueil-Malmaison (FR)

(72) Inventors: Elena Sanz, Lyons (FR); Robert Beaumont, Rillieux la Pape (FR); Christophe Boyer, Charly (FR); Daniel Gonnet, Bures sur Yvette (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 14/435,492

(22) PCT Filed: Sep. 24, 2013

(86) PCT No.: PCT/FR2013/052243
§ 371 (c)(1),
(2) Date: Apr. 14, 2015

(87) PCT Pub. No.: WO2014/060671
PCT Pub. Date: Apr. 24, 2014

(65) Prior Publication Data
US 2015/0258518 A1   Sep. 17, 2015

(30) Foreign Application Priority Data
Oct. 17, 2012   (FR) ...................................... 12 02772

(51) Int. Cl.
*B65B 1/04*   (2006.01)
*B01J 8/06*   (2006.01)
*B01J 8/00*   (2006.01)

(52) U.S. Cl.
CPC   *B01J 8/06* (2013.01); *B01J 8/002* (2013.01); *B01J 8/003* (2013.01); *B01J 8/0025* (2013.01); *B01J 2208/00752* (2013.01); *B01J 2208/00778* (2013.01)

(58) Field of Classification Search
CPC ........ B01J 8/0025; B01J 8/002; B01J 8/003; B01J 2208/00752; B01J 2208/00778
See application file for complete search history.

(56) References Cited

U.S. PATENT DOCUMENTS 8,578,978 B2 *   11/2013   Sanz ........................ B01J 8/002
                                                                  141/1
2011/0083769 A1   4/2011   Sanz et al.

FOREIGN PATENT DOCUMENTS

| EP | 1374985 A1 | 1/2004 |
|----|------------|--------|
| FR | 2950822 A1 | 4/2011 |
| WO | 2005053833 A1 | 6/2005 |

OTHER PUBLICATIONS

International Search Report and Search Opinion from PCT/FR2013/052243 dated Jan. 27, 2014.

* cited by examiner

*Primary Examiner* — Jason K Niesz
(74) *Attorney, Agent, or Firm* — Miller, White, Zelano, Branigan, P.C.

(57) ABSTRACT

A device and a method are disclosed for densely and homogeneously loading catalyst into the annular space of bayonet tubes utilized in a steam reforming reactor. The device is of pneumatic type and uses a detachable feed tube for introducing gas into the annular space.

9 Claims, 2 Drawing Sheets

Example:
Total air flow rate: 250 m$^3$/h, distributed between
- two stainless steel tubes OD 38 x 1.25 mm, ID 35.5 mm (2 x 100 m$^3$/h)
- syngas tube (50 m$^3$/h)

Number of holes: per tube: 20 holes for 100 m$^3$/h
Diameter of holes: 10 mm

Velocity of the jets: 17.68 m/s in the 10 mm holes
(instead of 28 m/s in ID 35.5, in the first configuration with a single tube, jet of air directed downwards which would lift the pellets)

PNEUMATIC SYSTEM FOR DENSELY LOADING CATALYST INTO BAYONET TUBES FOR A STEAM REFORMING REACTOR-EXCHANGER WITH A DETACHABLE FEED TUBE FOR GAS

FIELD OF THE INVENTION

The present invention relates to the field of loading catalyst tubes used in tubular reactors carrying out highly endothermic or highly exothermic reactions. The present invention is therefore particularly suitable for a steam reforming reactor for natural gas or for various hydrocarbon-containing fractions in order to produce the $CO+H_2$ mixture called synthesis gas. Two main types of steam reforming reactor can be distinguished.

Reactors in which the heat is supplied by a group of burners situated inside the reactor, and those in which the heat is supplied by a fluid heat carrier, generally combustion gases, said combustion taking place outside of the steam reforming reactor itself.

Some reactors of this latter type, called reactor-exchanger below, make use of single tubes. Others make use of double concentric tubes also called bayonet tubes. A bayonet tube can be defined as an inner tube surrounded by an outer tube coaxial with the inner tube, the annular space between the inner tube and the outer tube being generally filled with catalyst. In the text which follows, reference is made to the annular space or the catalyst zone in order to indicate said annular space defined by the bayonet tubes.

Within the scope of the present invention, the natural gas, or more generally the hydrocarbon -containing feedstock, is introduced via the annular zone according to a flow from top to bottom, and the reaction effluents are collected in the central part of the inner tube according to a flow from bottom to top.

The steam reforming reaction of the natural gas for the production of hydrogen, is very endothermic and therefore generally takes place in furnaces or reactor-exchangers in the manner defined previously.

The reaction takes place at very high temperatures, typically 900° C. and under pressure, typically from 20 to 30 bars. Under these conditions, it is only possible to envisage implementing the reaction in an economically viable manner inside tubes because of the mechanical properties of the materials.

Catalytic reactor-exchangers are therefore composed of a multitude of tubes, typically of the order of 200 to 300 tubes for units producing 100,000 $Nm^3/h$ of hydrogen, this set of tubes being enclosed in a shell which receives the hot fluid making it possible to supply the necessary calories to the steam reforming reaction.

This hot fluid or fluid heat carrier is generally composed of the gases from a combustion taking place outside the reactor-exchanger.

The catalyst must therefore be installed in all of the steam reforming tubes evenly from one tube to the other, in order to have an identical pressure drop from one tube to the other. This condition is very important in order to guarantee that the reactants are well distributed between all of the catalyst tubes and to avoid one tube being, for example, less well supplied which could lead to the material constituting the tube overheating significantly, this overheating also reducing the lifetime of the tube.

Similarly, it is important that there is no empty space, that is to say without catalyst or depleted of catalyst, in a tube because again the tube could overheat locally due to a lack of catalytic reaction inside. In addition, any heterogeneity in the distribution of catalyst in the reaction zone may result in an uneven flow of the reaction fluid or fluids.

The device according to the present invention therefore aims to load each of the bayonet tubes making up the reactor-exchanger both densely and homogeneously.

EXAMINATION OF THE PRIOR ART

This examination will be limited to the pneumatic type of device.

Patent FR 2950822 by the Applicant describes a solution for loading bayonet tubes with 3 loading tubes, with mechanical slowing or pneumatic slowing. This loading method makes it possible to load bayonet tubes densely and uniformly. Given that it is a "grain-by-grain" method, it proves to be too slow and not suitable for use on the scale of an industrial reactor comprising several hundred tubes.

Patent EP1374985 describes a loading system with a detachable tube for the introduction of a counter current gas flow which slows the fall of the particles. This system applies to conventional tubes for steam reforming natural gas, but it does not take into account the specific features of bayonet tubes.

The device according to the present invention leads to a significant reduction in the flow rate supplied by the tube bringing the auxiliary gas. The distribution between a principal flow rate brought by the auxiliary tube, and a fixed flow rate crossing the particle bed being formed, leads to a better distribution of the particles within the bed, and allows any fine particles which are possibly formed during the filling process to be recovered.

None of the documents found relates to an application to bayonet tubes with loading of an annular zone.

The device which is a subject of the present invention can therefore be defined as a pneumatic device for densely loading catalyst into the annular zone of the bayonet tubes fitted in a steam reforming reactor-exchanger, the device making it possible to load each of the tubes of the reactor-exchanger homogeneously in terms of density taking into account a time constraint compatible with the demands of industrial use.

In addition, in a certain number of cases, the device according to the invention must be able to adapt to variations in the interior diameter of the outer tube, imposed by the mechanical and thermal stresses which develop along the tube and therefore to a change in the dimensions of the annular zone. None of the devices in the prior art takes into account this additional constraint.

SUMMARY DESCRIPTION OF THE INVENTION

Figure 1:
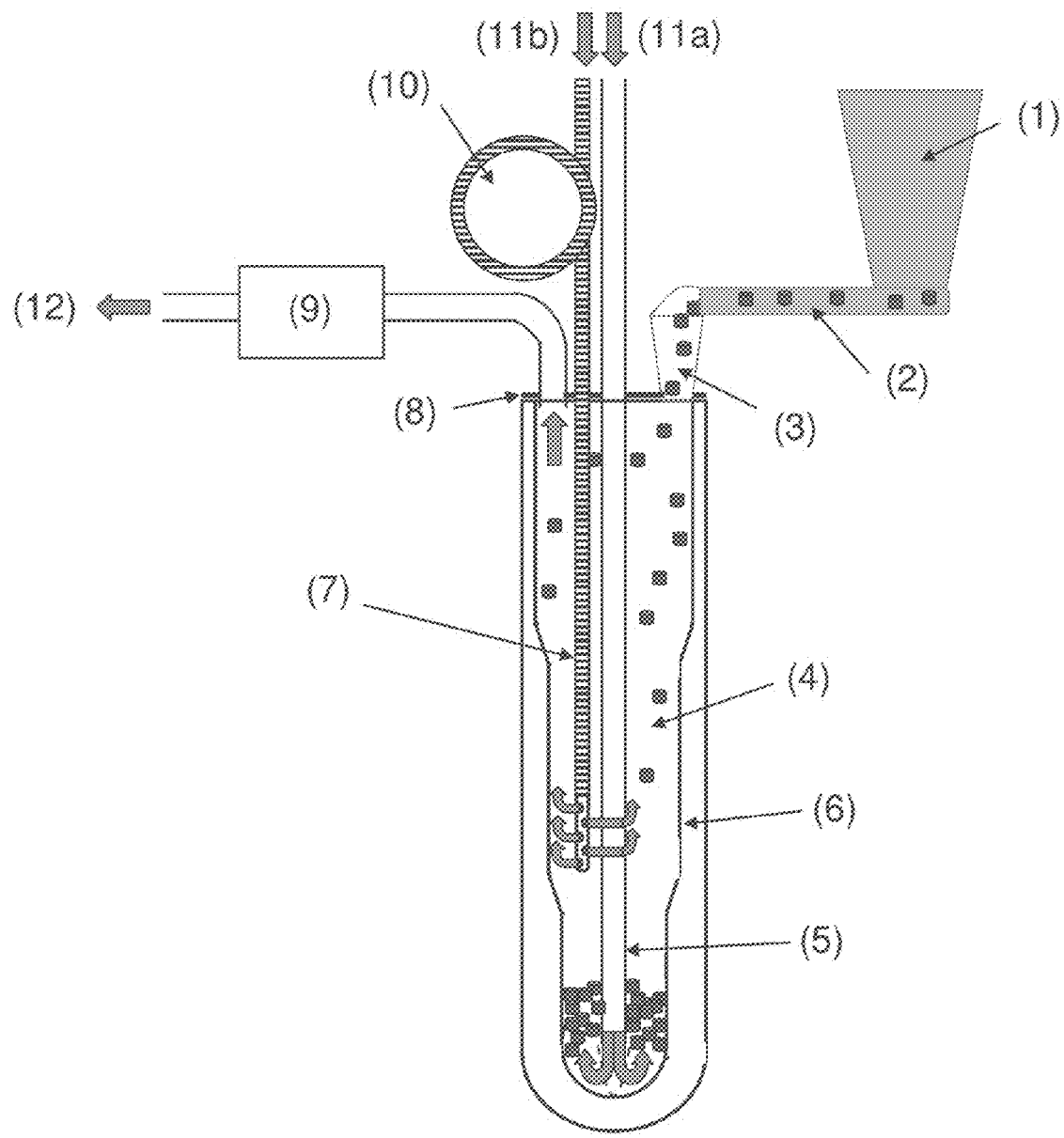
FIG. 1 represents the device according to the invention in which the flexible detachable tube (7) introduces a gas flow (11b) into the annular zone (4).

The present invention can be defined as a device for densely filling catalyst into a steam reforming reactor-exchanger consisting of a plurality of bayonet tubes enclosed in a shell, each bayonet tube comprising an annular zone (4) at least partially filled with catalyst. Said catalyst is composed of solid particles occupying at least in part the annular space (4) between an inner tube (5) and an outer tube (6), these two tubes together constituting the bayonet tube, the width of said annular space being comprised between 30 mm and 80 mm, and its height being comprised between 10 and 20 meters.

The catalyst particles generally are in the shape of cylinders with an approximate height of 10 mm to 20 mm, and an approximate diameter of 5 mm to 20 mm.

The device according to the present invention consists in its basic version of:

- a detachable flexible tube (7) entering inside the annular zone (4) and being maintained at a distance from the surface of the bed being formed comprised between 50 mm and 100 mm, said tube bringing a fraction (11b) of the necessary gas flow rate comprised between 70% and 85%, the complementary part being brought by the inner tube (5),
- said detachable tube (7) winding around a winder (10) located outside of the tube to be filled, and the catalyst particles being contained in:
- a central hopper (1) making it possible to deliver the particles on a conveyor belt or a shaking conveyor (2) feeding the annular space (4), using:
- a funnel (3), through which the particles flow into the inside of the annular space (4). The detachable tube (7) can be equipped at its end with an end piece which is closed in the outlet section but open for gas to exit via a series of lateral holes arranged in one or more rows. The diameter of the holes is typically comprised between 10 and 15 mm and the spacing between rows of holes is comprised between 15 and 30 mm, each row comprising from 3 to 8 holes.

The purpose of these lateral holes is to prevent the formation of a jet of gas orientated vertically (that is to say along the axis of the tube) which can disturb the surface of the particle bed being formed if an insufficient distance is maintained between the end of the tube (7) and said surface of the bed.

The end piece with lateral holes therefore allows the tube (7) to be brought closer to the surface of the bed, while maintaining a certain drop height of the particles which are not slowed. In fact, without an end piece with lateral holes, the effect of slowing the particles is produced up until they reach the surface of the bed. With an end piece with lateral holes, the gas which is introduced rises much more quickly towards the top, almost from its exit from the lateral holes, and there is therefore a final part of the path of the particles over which they are not slowed.

This final part which is not slowed is useful because it makes it possible to guarantee the loading density. And moreover this final part which is not slowed down does not need to be too significant in order to avoid the particles being broken. It can therefore be usefully controlled by the use of an end piece with lateral holes which makes it possible to adjust said drop height which is not slowed.

The present invention also consists of a method for loading catalyst using the device described previously, a method which can be described by the following series of steps:

- the flexible detachable tube (7) is initially wound in the external winder (10), the hopper (1) being filled with solid,
- the flexible detachable tube (7) is introduced progressively into the annular zone (4) by its upper part until its lower end is located at a distance comprised between 50 cm and 100 cm with respect to the bottom of the tube.
- a constant gas flow rate is introduced by the central tube (5) corresponding to a velocity in the annular space (4) comprised between 0.1 m/s and the minimum fluidizing velocity of the grains of catalyst (between 3 and 4 m/s for the catalysts conventionally used in steam reforming),
- another gas flow rate is introduced by the detachable flexible tube (7), the sum of the two flow rates corresponding to a velocity in the annular space comprised between 8 m/s and 14 m/s, which is still less than the terminal velocity of fall of the particles,
- the conveyor belt or the shaking conveyor (2) is started in such a way as to supply a flow rate of solid comprised between 250 kg/h and 500 kg/h, solid which is introduced into the annular zone (4) using the funnel (3),
- as the annular zone (4) fills up, the flexible detachable tube (7) is pulled up from the annular zone (4) using the external winder (10), in such a way that a constant distance is maintained with respect to the surface of the bed which is building up progressively, said distance always being comprised between 50 cm and 100 cm,
- the flexible detachable tube (7) is wound up at a speed which is equivalent to the loading speed of the tube which is comprised between 0.2 meter/min and 0.4 meter/min,
- once the bayonet tube is loaded and the loading system is wound up, the flexible detachable tube (7) is moved in order to load the next tube.

The gas used to implement the loading method according to the invention is generally air or nitrogen.

Depending on the flow rates of solid particles to be loaded, two or three identical flexible detachable tubes (7) can be used which operate in parallel. In the following text, when a flexible detachable tube (7) is mentioned, one or more flexible detachable tubes (7) are therefore meant.

In addition, a loading hopper (1) can supply a group of two or three bayonet tubes, each equipped with a device according to the present invention.

DETAILED DESCRIPTION OF THE INVENTION

The present invention can be defined as a device making it possible to load catalyst densely into the annular space (4) of bayonet tubes, each tube having a height comprised between 10 and 20 m, a diameter of the outer tube (6) comprised between 250 mm and 150 mm, and an outer diameter of the inner tube (5) comprised between 10 and 40 mm.

The annular space (4) containing the catalyst therefore has a typical width of approximately 50 mm. In practice, depending on the case, the typical width of the annular space (4) could vary between 80 and 30 mm.

In addition, in certain cases, the outer tube (6) has a diameter which decreases by sections from top to bottom, which means that the typical width of the annular space (4) also decreases from top to bottom.

The device according to the invention makes it possible to adapt very easily to these variations in the typical width while retaining their performance over all of the sections.

The adaptation then consists of adjusting the gas flow rate introduced by the flexible detachable tube (7) in such a way as to maintain the velocity range from 8 to 14 m/s.

The grains of catalyst generally are in the shape of cylinders of approximately 10 mm to 20 mm in height and 5 mm to 20 mm in diameter.

One of the main problems posed by loading these grains into tubes of more than 10 meters in length is the risk of them breaking if they are simply allowed to drop in free fall without any precautions, which is one of the solutions comprised in the prior art for carrying out dense loading. It is generally accepted that the risk of the grains breaking is significant from a drop height of 1 meter.

Other problems are linked to the inherent geometry of the annular catalyst space, which prevents the passage of conventional loading systems.

Frequently, in the context of the present invention, it is necessary to take into account the inner tube (5) which passes through the outer tube (6) in the upper part of the annular zone (4) to allow a totally clear outlet for the reaction effluents.

Finally, as indicated in the prior art, the risk of cavities forming is increased when the ratio between the diameter of the tube and the main dimension of the particles is less than 8, which is often the case in the context of the present invention, as the typical width of the annular space (50 mm) is equivalent to approximately 4 times the typical diameter of the catalyst particles.

An important constraint that must also be respected by the loading device is that, as loading is carried out tube by tube or in limited groups of two or three tubes, it must be sufficiently rapid for use on an industrial scale as a steam reforming reactor aiming to produce approximately 100,000 $Nm^3/h$ of $H_2$ contains approximately 200 to 350 bayonet tubes.

The present invention describes a system for loading a bayonet tube by means of a gas flow, generally of air, which is in counter current to the fall of the particles, which therefore slows the fall of said particles and thus prevents them from breaking, and makes it possible to load homogeneously and without blocking.

The terminal velocity of fall of the grains in question is approximately 14 m/s. In order to prevent the grains from rupturing, the particles must fall at a velocity of less than 3 m/s and preferably of less than 2 m/s.

The velocity of the gas current must be between 11 m/s and 13 m/s in order to slow the fall of the particles. Obtaining such a velocity in the annular space (4) requires that a significant gas flow rate is introduced. The introduction of such a flow rate by the inner tube (5) with a diameter typically comprised between 30 mm and 50 mm can generate velocities inside this tube which are too high and can also lead to a sonic flow.

In the present invention, the gas flow rate necessary to slow the particles adequately is obtained in two parts; a constant part of the flow rate necessary to slow the particles is introduced by the inner tube (5) of the bayonet, the complementary part being introduced by a flexible detachable tube (7) opening above the particle bed being formed at a distance of between 50 mm and 100 mm.

The flow inside the inner tube (11a) is such that it generates a velocity in the annular space (4) which is less than the minimum fluidizing velocity of the grains of catalyst which is comprised between 3 and 4 m/s, in order to keep the particle bed being formed in the state of a fixed bed, but to remove the fine particles which may have been generated during the loading. The complementary part of the gas flow rate (11b) is introduced by a detachable flexible tube (7), the diameter of which varies between 0.5 and 0.9 times the width of the annular space (of the smallest of the annular spaces in the case of a tube with a change in the inner diameter of the outer tube).

The velocity in the annular space (4) downstream of the particle bed in the direction of the gas flow, calculated from the sum of the flow rates introduced by the detachable tubes (7) and inner tubes (5), must be between 2 m/s and 4 m/s less than the terminal velocity of fall (approximately 13-14 m/s for the grains conventionally used in steam reforming), in such a way as to guarantee the effective slowing of the particles without causing the grains to rise in the direction of the gas flow. The flexible detachable tube (7) is raised progressively as the particle bed is formed in the annular zone (4).

Bulk loading takes place through the upper opening in the annular zone (4) of the bayonet tube, by means of a loading hopper (1) and a shaking conveyor or conveyor belt (2).

Between the shaking conveyor (2) and the bayonet tube, a flexible coupling (3) is used to channel the catalyst while preventing the transmission of vibrations to the tubes. The system for loading solid (hopper (1), shaking conveyor or conveyor belt (2) and flexible coupling (3)) must be closed and airtight in order to prevent the gas from escaping through the loading device. The inlet to the annular space (4) must also be guaranteed to be air-tight (8).

The air flow leaving the bayonet tube, loaded with fine particles, passes through a filter (9) which makes it possible to retain dust and to expel a clean gas (12).

Together the seals ensure that the gas only passes through the filtration system (9).

The variations in the sections of the annular zone (4) are taken into account by a variation in the gas flow rate introduced by the flexible detachable tube (7). The gas flow rate introduced by the inner tube (5) generally remains constant.

Figure 2:
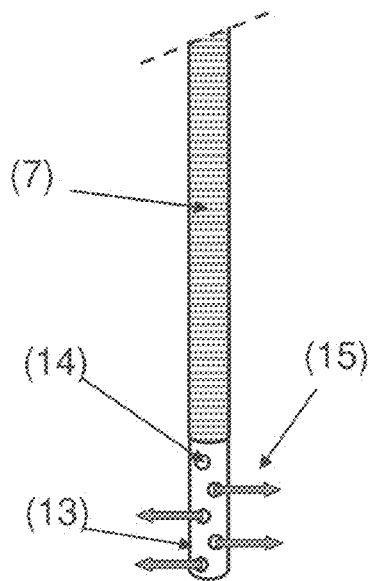
FIG. 2 shows an embodiment of the end piece (13) of the flexible detachable tube (7) with rows of lateral holes (14).

FIG. 2 shows the detachable flexible tube (7) equipped at its end with an end piece (13) which is closed at its end but has a series of lateral holes (14) arranged in one or more rows for the discharge of gas laterally (15).

EXAMPLE ACCORDING TO THE INVENTION

Loading tests have been carried out with the device according to the invention in an experimental column with a height of 1 m, constituted by an inner tube (5) with an outer diameter of 42 mm and an inner diameter of 32.2 mm, and an outer tube (6) with an inner diameter of 128.1 mm.

The solid particles to be loaded are in the shape of small cylinders with a height of 1.5 cm and a diameter of 0.8 cm.

A detachable flexible tube (7) with an inner diameter of 30 mm is introduced via the annular space and is maintained at a distance of 50 cm from the surface of the bed. The device is raised continuously at a velocity of 0.3 m/min.

An air flow rate of 0.0345 $m^3/s$ is introduced by the inner tube (5), which corresponds to a velocity of 42.4 m/s inside the inner tube.

A flow rate of 0.0897 $m^3/s$ is introduced by the detachable tube (7), which corresponds to a velocity of 127 m/s inside the detachable tube. In total, a flow rate of 0.1242 $m^3/s$ passes through the empty part of the annular space (4), generating a velocity of 10.8 m/s.

The terminal velocity of fall of the particles having been measured at 13.8 m/s, the particles fall at a velocity of 3 m/s.

The flow rate introduced by the inner tube (5) which passes through the fixed bed (0.0345 $m^3/s$) generates an upward velocity in the annular space (4) of 3 m/s, less than the minimum fluidizing velocity (estimated at 3.76 m/s), but sufficient to entrain the fine particles.

Once the bed is loaded, the measurement of ΔP is measured with an air flow rate of 130 $Nm^3/h$.

After unloading, the broken particles are isolated from the batch. The breakage rate is very low, of the order of 0.5%.

The results of the loading are shown in Table 1 below.

The loading obtained with this system is very satisfactory, with a very good reproducibility in terms of loss of load (deviations from the mean less than ±3%).

The loading time is between 3 and 4 minutes/meter, which corresponds to a maximum time of 48 minutes for a 12 m tube (for a solid flow rate of approximately 320 kg/h).

The loading density is 968 kg/m³, reproducible in all of the loadings.

TABLE 1 results of the loadings with a pneumatic system on a 1 m model.

| Loading time (min) | Unloading time (min) | Height of solid (cm) | Loading density (kg/m³) | Loss of load (mm H₂O) | Deviation from the mean | Breakage rate |
|---|---|---|---|---|---|---|
| 3'31" | 10' | 98 | 968 | 270 | 0.37% | 0.51% |
| 3'20" | 9' | 98 | 968 | 262 | −2.6% | 0.53% |
| 3'90" | 10' | 98 | 968 | 277 | +2.97% | 0.55% |

Average loss of load 269

The invention claimed is:

1. A device for densely filling catalyst particles into a steam reforming reactor-exchanger, to form a catalyst bed composed of catalyst particles therein, said steam reforming reactor-exchanger containing a plurality of bayonet tubes enclosed in a shell wherein each bayonet tubes having an inner tube (5) and an outer tube (6) with an annular space between said inner tube (5) and said outer tube (6), said catalyst bed occupying at least in part the annular space (4) between said inner tube (5) and said outer tube (6), wherein the width of said annular space (4) is between 40 mm and 80 mm, and the height of said annular space (4) is between 10 and 20 meters, said catalyst particles being in the shape of cylinders with a height between 10 mm and 20 mm, and a diameter between 5 mm and 20 mm, wherein said device comprises:

a detachable flexible tube (7), having a first end, adapted to enter inside said annular zone (4) of one of said bayonet tubes so that said first end can be maintained at a distance between 150 mm and 200 mm from the surface of said catalyst bed, said flexible tube capable of introducing between 70% and 85% of a gas flow introduced into said annular space during the filling thereof with said catalyst particles, the remaining portion of said gas flow being introduced into the annular space by said inner tube (5), the diameter of said detachable flexible tube (7) being between 0.5 and 0.9 times the width of said annular space (4) or between 0.5 and 0.9 times of the smallest width of said annular space (4) in the case where said outer tube (6) has a changing diameter, a winder (10) located outside of the bayonet tube to be filled for winding and unwinding said detachable flexible tube (7), a central hopper (1) containing catalyst particles for delivering catalyst particles onto a conveyor belt or onto a shaking conveyor (2) for feeding catalyst particles into said annular space (4) via a funnel (3), through which the catalyst particles flow into said annular space (4).

2. The device according to claim 1, wherein said detachable tube (7) is equipped at said first end end with an end piece which is closed at the end thereof and provided with a series of lateral holes arranged in one or more rows for the discharge of said gas flow, the diameter of said lateral holes being between 10 and 15 mm and the spacing between rows of said lateral holes being between 15 and 30 mm, each row having from 3 to 8 holes.

3. A method for loading catalyst into a bayonet tube using the device according to claim 1, said method comprising:

winding said detachable flexible tube (7) around said winder (10), and filing said central hopper (1) with catalyst particles, introducing said detachable flexible tube (7) progressively into said annular zone (4) until said first end is located at a distance between 50 cm and 100 cm with respect to the bottom of said bayonet tube, introducing a constant gas flow into said inner tube (5) of said bayonet tube at a rate corresponding to a velocity in said annular space between 0.1 m/s and the minimum fluidizing velocity of the catalyst particles, and introducing another gas flow into said detachable flexible tube (7), wherein the sum of the flow rates of said gas flow and said another gas flow corresponds to to a velocity in said annular space between 8 m/s and 14 m/s, which is still less than the falling velocity of the catalyst particles that will cause the catalyst particles to break, starting said conveyor belt or shaking conveyor (2) to supply a flow rate of between 250 kg/h and 500 kg/h of said catalyst particles into said annular zone (4) via said funnel (3), winding up said detachable flexible tube (7) using said winder (10) as said annular zone (4) fills up with catalyst particles, in such a way that a constant distance is maintained with respect to the surface of the catalyst bed which is building up progressively, said distance being between 50 cm and 100 cm, wherein the winding up of said detachable flexible tube (7) is conducted at a speed which is equivalent to a loading speed of catalyst particles into said bayonet tube between 0.2 m/min and 0.4 m/min, and once said bayonet tube is loaded with catalyst particles, winding up said detachable flexible tube (7) unto said winder (10) and moving said detachable flexible tube (7) to the next bayonet tube to be loaded.

4. The method according to claim 3, wherein the gas used in said gas flows is air or nitrogen.

5. The method according to claim 3, wherein said detachable tube (7) is equipped at said first end with an end piece which is closed at the end thereof and provided with a series of lateral holes arranged in one or more rows for the discharge of said gas flow, the diameter of said lateral holes being between 10 and 15 mm and the spacing between rows of said lateral holes being between 15 and 30 mm, each row having from 3 to 8 holes.

6. The method according to claim 3, wherein gas flow rates into said annular space are sufficient for the falling velocity of the catalyst particles in said annular space is between 2 m/s and 4 m/s less than the terminal velocity of fall for the catalyst particles.

7. The method according to claim 3, wherein the falling velocity of the catalyst particles in said annular space is less than 3 m/s.

8. The method according to claim 3, wherein the falling velocity of the catalyst particles in said annular space is less than 2 m/s.

9. The method according to claim 3, wherein the sum of the flow rates of said gas flow and said another gas flow corresponds to a velocity in said annular space between 11 m/s and 13 m/s.

* * * * *